(12) United States Patent
Wongsasulux et al.

(10) Patent No.: US 12,387,871 B2
(45) Date of Patent: Aug. 12, 2025

(54) LEAKAGE TRANSFORMER

(71) Applicant: Delta Electronics (Thailand) Public Company Limited, Samutprakarn (TH)

(72) Inventors: Jakrapong Wongsasulux, Samutprakarn (TH); Chaiwichit Suraprechakul, Samutprakarn (TH)

(73) Assignee: Delta Electronics (Thailand) Public Company Limited, Samutprakarn (TH)

( * ) Notice: Subject to any disclaimer, the term of this patent is extended or adjusted under 35 U.S.C. 154(b) by 0 days.

(21) Appl. No.: 18/222,279

(22) Filed: Jul. 14, 2023

(65) Prior Publication Data

US 2023/0360849 A1    Nov. 9, 2023

Related U.S. Application Data

(62) Division of application No. 16/814,245, filed on Mar. 10, 2020.

(51) Int. Cl.
| | | |
|---|---|---|
| H01F 27/34 | (2006.01) | |
| H01F 3/12 | (2006.01) | |
| H01F 27/28 | (2006.01) | |
| H01F 38/08 | (2006.01) | |

(52) U.S. Cl.
CPC ............ H01F 27/34 (2013.01); H01F 27/28 (2013.01); H01F 38/08 (2013.01)

(58) Field of Classification Search
CPC .......... H01F 27/34; H01F 27/28; H01F 38/08; H01F 3/10; H01F 3/12; H01F 27/306; H01F 27/24; Y02B 70/10
USPC ................. 336/178, 220–223, 133, 155–165
See application file for complete search history.

(56) References Cited

U.S. PATENT DOCUMENTS

| | | | | |
|---|---|---|---|---|
| 2,145,703 | A | * | 1/1939 | Wirz ...................... H01F 38/08 336/160 |
| 2,578,395 | A | * | 12/1951 | Brooks ................... H01F 38/10 315/231 |
| 5,726,615 | A | | 3/1998 | Bloom |
| 7,116,204 | B2 | | 10/2006 | Fushimi |
| 2005/0068149 | A1 | | 3/2005 | Fushimi |
| 2005/0088113 | A1 | | 4/2005 | Ushijima et al. |
| 2005/0286270 | A1 | | 12/2005 | Petkov et al. |
| 2008/0088403 | A1 | * | 4/2008 | Suzuki ............... H05B 41/2822 336/198 |

(Continued)

FOREIGN PATENT DOCUMENTS

| | | |
|---|---|---|
| CN | 2859766 Y | 1/2007 |
| CN | 101006533 A | 7/2007 |

(Continued)

*Primary Examiner* — Tuyen T Nguyen
(74) *Attorney, Agent, or Firm* — KIRTON McCONKIE; Evan R. Witt (57) ABSTRACT

A leakage transformer is provided. The leakage transformer includes a first plate, a second plate, a plurality of winding pillars, a primary winding, a secondary winding and a plurality of magnetic shunt elements. Each magnetic shunt element is disposed between the two corresponding winding pillars, and there is a gap between every two neighboring magnetic shunt elements. Alternatively, the magnetic shunt element is disposed on the first plate and aligned with the corresponding winding pillar, and there is a gap between the magnetic shunt element and the second plate. A leakage inductance of the leakage transformer is determined by the gap.

4 Claims, 6 Drawing Sheets

(56) References Cited

U.S. PATENT DOCUMENTS

| | | | | |
|---|---|---|---|---|
| 2010/0019875 | A1* | 1/2010 | Ger | ............ H01F 3/10 336/220 |
| 2014/0286054 | A1 | 9/2014 | Krause | |
| 2017/0324343 | A1 | 11/2017 | Ishigaki et al. | |
| 2017/0330678 | A1* | 11/2017 | Harrison | ............ H01F 3/10 |

FOREIGN PATENT DOCUMENTS

| | | |
|---|---|---|
| CN | 201247685 Y | 5/2009 |
| CN | 201319301 Y | 9/2009 |
| CN | 101840769 A | 9/2010 |
| CN | 202275691 U | 6/2012 |
| CN | 203103100 U | 7/2013 |
| CN | 203941798 U | 11/2014 |
| CN | 104952591 A | 9/2015 |
| CN | 108880280 A | 11/2018 |
| CN | 109787484 A | 5/2019 |
| EP | 1078557 A1 | 2/2001 |
| JP | H05299271 A | 11/1993 |
| JP | H06267772 A | 9/1994 |
| JP | H09120910 A | 5/1997 |
| JP | 2005108933 A | 4/2005 |
| WO | 2016185632 A1 | 11/2016 |

* cited by examiner

LEAKAGE TRANSFORMER

CROSS-REFERENCE TO RELATED APPLICATION

This application is a Divisional Application of U.S. patent application Ser. No. 16/814,245 filed on Mar. 10, 2020 and entitled "LEAKAGE TRANSFORMER", the entirety of which is hereby incorporated by reference.

FIELD OF THE INVENTION

The present disclosure relates to a leakage transformer, and more particularly to have a leakage inductance provided by introducing the magnetic shunt elements.

BACKGROUND OF THE INVENTION

The resonant converter becomes more and more popular in power electronics industry. In order to achieve higher power density, the inductor and the transformer are combined together. Generally, the leakage inductance of transformer is created by making a loose coupling between the primary and secondary windings. However, it requires large distance for achieving high leakage inductance, which deteriorates the power density.

Therefore, there is a need of providing a leakage transformer to obviate the drawbacks encountered from the prior arts.

SUMMARY OF THE INVENTION

It is an objective of the present disclosure to provide a high leakage transformer. The leakage inductance of the high leakage transformer is determined by a gap defined by the magnetic shunt elements rather than the gap between the winding pillars. Therefore, both the high power density and the high leakage inductance are taken into consideration. In addition, the winding of the leakage transformer are split into a plurality of parts wound around the winding pillars respectively, which can significantly reduce the proximity loss on windings.

In accordance with an aspect of the present disclosure, there is provided a leakage transformer. The leakage transformer includes a first plate, a second plate, a plurality of first winding pillars, a plurality of second winding pillars, a primary winding, a secondary winding and a plurality of magnetic shunt elements. The plurality of first winding pillars is disposed on the first plate. The plurality of second winding pillars is disposed on the second plate and aligned with the plurality of first winding pillars respectively. The primary winding is wound around the plurality of first winding pillars. The secondary winding is wound around the plurality of second winding pillars. Each magnetic shunt element is disposed between the first winding pillar and the corresponding second winding pillar. There is a gap between every two neighboring magnetic shunt elements, and a leakage inductance of the leakage transformer is determined by the at least one gap.

In accordance with another aspect of the present disclosure, there is provided a leakage transformer. The leakage transformer includes a first plate, a second plate, a plurality of winding pillars, a primary winding, a secondary winding and a plurality of magnetic shunt element. The plurality of winding pillars is disposed on the first plate. The primary winding and the secondary winding are wound around the plurality of winding pillars. The plurality of magnetic shunt elements is disposed on the first plate and aligned with the plurality of winding pillars respectively. There is a gap between the magnetic shunt element and the second plate, and a leakage inductance of the leakage transformer is determined by the gaps.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
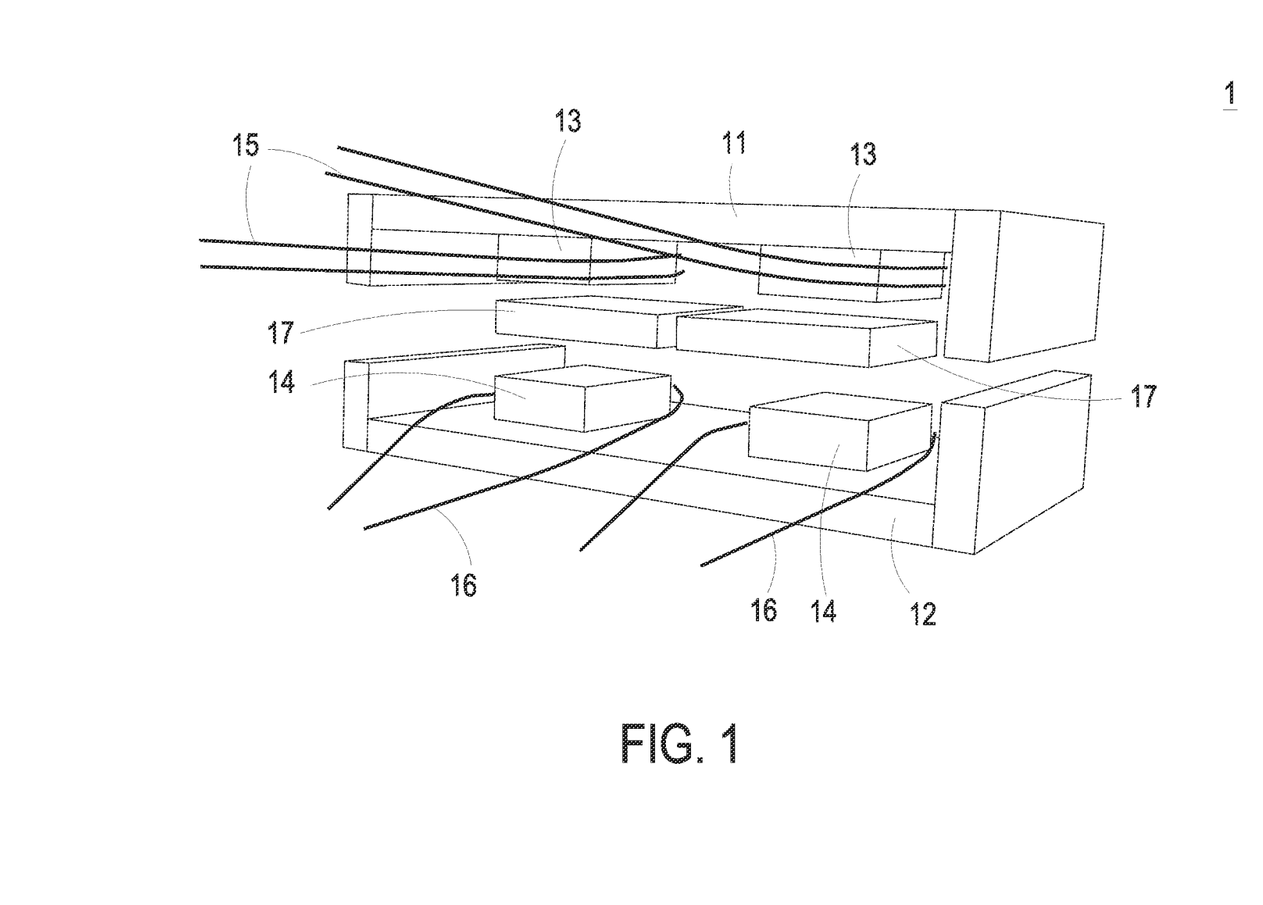
FIG. 1 is a schematic exploded view illustrating a leakage transformer according to a first embodiment of the present disclosure.
Figure 2:
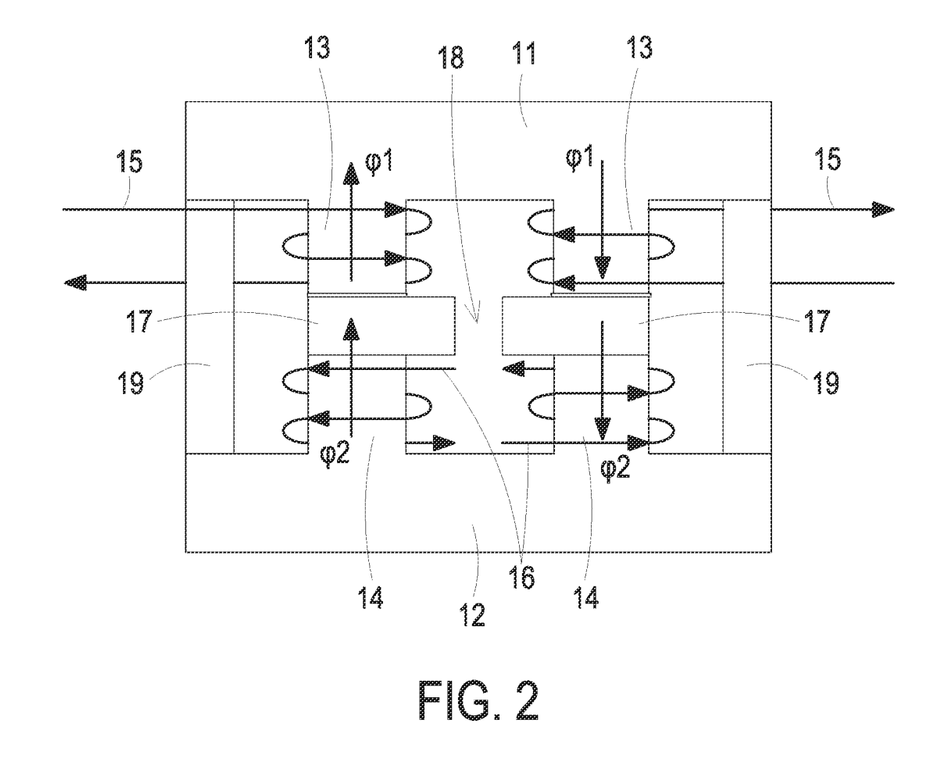
FIG. 2 is a schematic cross-sectional view illustrating the leakage transformer according to the first embodiment of the present disclosure.

FIG. 1 is a schematic exploded view illustrating a leakage transformer according to a first embodiment of the present disclosure, and FIG. 2 is a schematic cross-sectional view illustrating the leakage transformer according to the first embodiment of the present disclosure. As shown in FIG. 1 and FIG. 2, the leakage transformer 1 includes a first plate 11, a second plate 12, a plurality of first winding pillars 13, a plurality of second winding pillars 14, a primary winding 15, a secondary winding 16 and a plurality of magnetic shunt elements 17. In an embodiment, the leakage transformer 1 further includes two side pillars 19 between the first plate 11 and the second plate 12.

The plurality of first winding pillars 13 is disposed on the first plate 11, and the first winding pillars 13 are arranged with a specific interval. The plurality of second winding pillars 14 is disposed on the second plate 12, and the second winding pillars 14 are arranged with a specific interval. The second winding pillars 14 are aligned with the first winding pillars 13 respectively. Namely, the number of the first winding pillars 13 and the number of the second winding pillars 14 are the same, and the first winding pillars 13 are corresponding to the second winding pillars 14 one-to-one. In an embodiment, the number of the plurality of first winding pillars 13 is even, and the number of the plurality of second winding pillars 14 is even as well.

The primary winding 15 is wound around the plurality of first winding pillars 13. In an embodiment, the primary winding 15 is split into a plurality of parts wound around the plurality of first winding pillars 13 respectively. The plurality of parts of the primary winding 15 may be connected in series or in parallel. The secondary winding 16 is wound around the plurality of second winding pillars 14. In an embodiment, the secondary winding 16 is split into a plurality of parts wound around the plurality of second winding pillars 14 respectively. The plurality of parts of the secondary winding 16 may be connected in series or in parallel. In addition, the primary winding 15 and the secondary winding 16 are for example but not limited to coil or PCB (printed circuit board) trace.

Each of the plurality of magnetic shunt elements 17 is disposed between the corresponding first winding pillar 13 and second winding pillar 14. There is a gap 18 between every two neighboring magnetic shunt elements 17, and a leakage inductance of the leakage transformer 1 is determined by the at least one gap 18. In other words, the leakage inductance of the leakage transformer 1 is adjusted by varying the at least one gap 18. In an embodiment, the magnetic shunt element 17 is directly connected with the corresponding first winding pillar 13 and second winding pillar 14. In another embodiment, even there is a distance between the magnetic shunt element 17 and the corresponding first winding pillar 13 or second winding pillar 14, the distance therebetween is not large enough to affect the leakage inductance of the leakage transformer 1.

Consequently, the leakage inductance of the leakage transformer 1 is determined by a gap 18 defined by the magnetic shunt elements 17 rather than the gap between the winding pillars. Namely, the gap 18 is able to provide high leakage inductance without keeping large distance between the primary winding 15 and the secondary winding 16, which improves the power density. Therefore, both the high power density and the high leakage inductance are taken into consideration. In addition, the winding of the leakage transformer 1 are split into a plurality of parts wound around the winding pillars respectively, which can significantly reduce the proximity loss on windings. Moreover, since the primary winding 15 and secondary winding 16 are wound around different winding pillars, the capacitive coupling is low, which can reduce the common mode noise.

Figure 3:
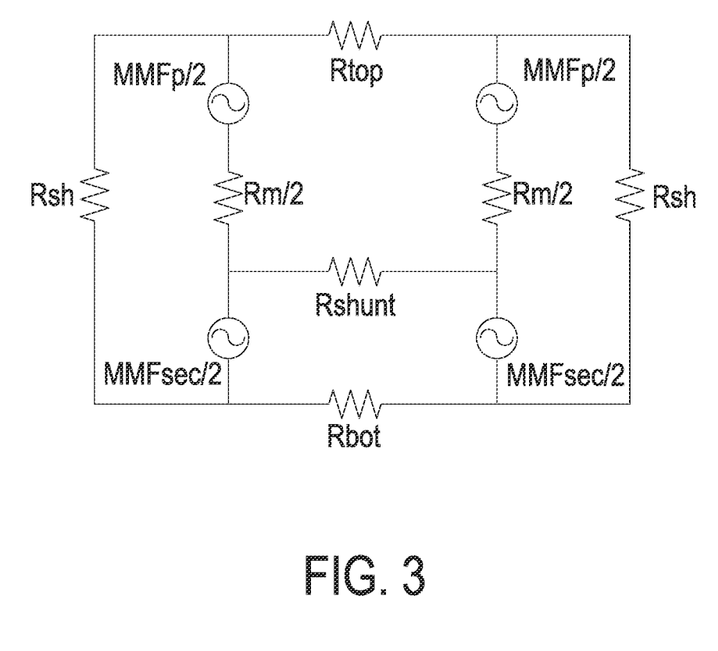
FIG. 3 is a schematic circuit diagram illustrating an equivalent circuit of the leakage transformer according to the first embodiment of the present disclosure.

In the embodiment shown in FIG. 1 and FIG. 2, the leakage transformer 1 includes two first winding pillars 13, two second winding pillars 14, two magnetic shunt elements 17, and one gap 18 between the two neighboring magnetic shunt elements 17. Meanwhile, the equivalent circuit of the leakage transformer 1 in this embodiment is shown in FIG. 3, where Rtop is the reluctance of the first plate 11, Rbot is the reluctance of the second plate 12, Rsh is the reluctance of the side pillar 19, Rm is the reluctance of the winding pillars, Rshunt is the sum of the reluctance of the gap 18 and the reluctance of the two magnetic shunt elements 17, MMFp is the primary magnetomotive force, MMFsec is the secondary magnetomotive force. MMFp is the result of multiplying the number of turns of the primary winding 15 by the primary current, and MMFsec is the result of multiplying the number of turns of the secondary winding 16 by the secondary current. The reluctance value of the magnetic shunt element 17 is much smaller than the reluctance value of the gap 18.

Figure 4:
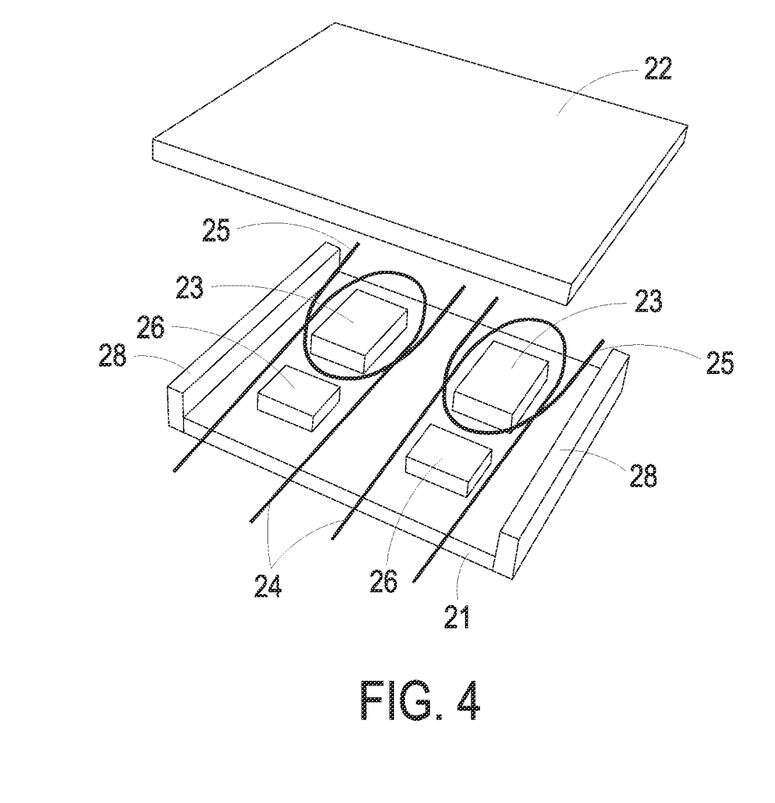
FIG. 4 is a schematic exploded view illustrating a leakage transformer according to a second embodiment of the present disclosure.
Figure 5:
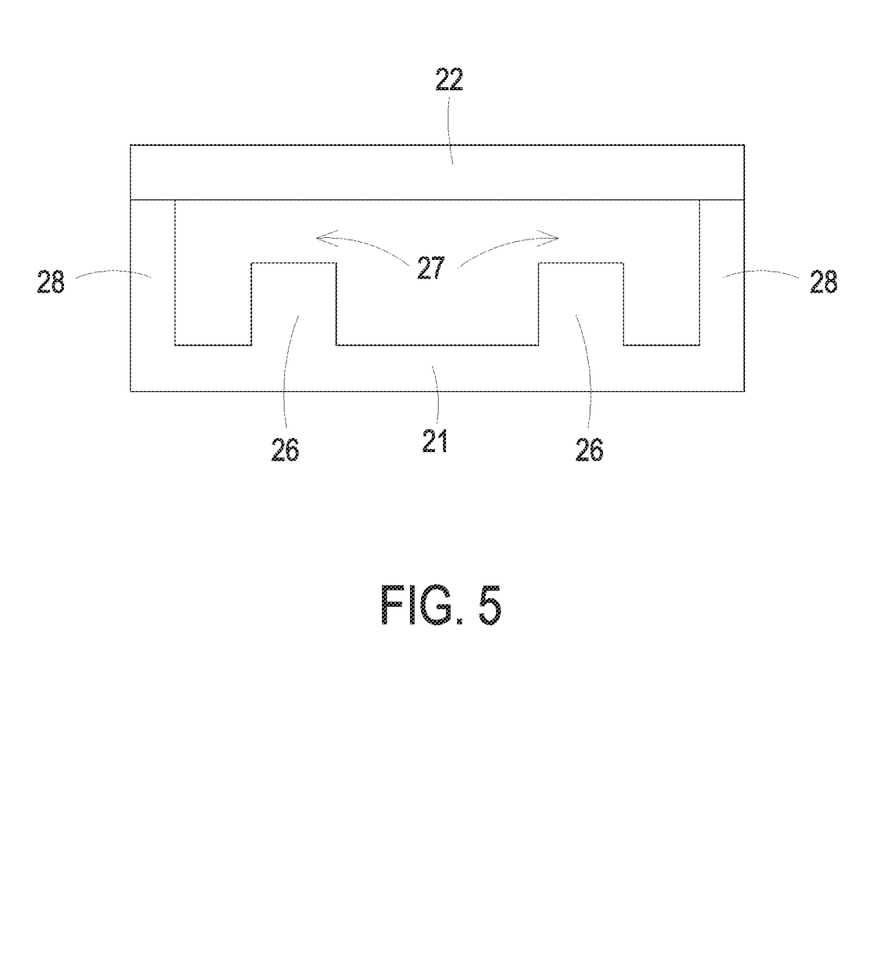
FIG. 5 is a schematic cross-sectional view illustrating the leakage transformer according to the second embodiment of the present disclosure.

FIG. 4 is a schematic exploded view illustrating a leakage transformer according to a second embodiment of the present disclosure, and FIG. 5 is a schematic cross-sectional view illustrating the leakage transformer according to the second embodiment of the present disclosure. As shown in FIG. 4 and FIG. 5, the leakage transformer 2 includes a first plate 21, a second plate 22, a plurality of winding pillars 23, a primary winding 24, a secondary winding 25 and a plurality of magnetic shunt elements 26. In an embodiment, the leakage transformer further includes two side pillars 28 between the first plate 21 and the second plate 22.

The plurality of winding pillars 23 is disposed on the first plate 21, and the winding pillars 23 are arranged with a specific interval. In an embodiment, the number of the plurality of winding pillars 23 is even. In an embodiment, the plurality of winding pillars 23 is directly connected with the second plate 22. In another embodiment, even there is a distance between the winding pillar 23 and the second plate 22, the distance therebetween is not large enough to affect the leakage inductance of the leakage transformer 2.

The primary winding 24 and the secondary winding 25 are wound around the plurality of winding pillars 23. In particular, the primary winding 24 is wound around the winding pillars 23 and the magnetic shunt element 26, and the secondary winding 25 is wound around the winding pillars 23 only. In an embodiment, the primary winding 24 is split into a plurality of parts wound around the plurality of winding pillars 23 respectively. The plurality of parts of the primary winding 24 may be connected in series or in parallel. In an embodiment, the secondary winding 25 is split into a plurality of parts wound around the plurality of winding pillars 23 respectively. The plurality of parts of the secondary winding 25 may be connected in series or in parallel. In addition, the primary winding 24 and the secondary winding 25 are for example but not limited to coil or PCB (printed circuit board) trace.

The magnetic shunt elements 26 are aligned with the winding pillars 23 respectively. Namely, the number of the magnetic shunt elements 26 and the number of the winding pillars 23 are the same, and the magnetic shunt elements 26 are corresponding to the winding pillars 23 one-to-one. There is a gap 27 between the magnetic shunt element 26 and the second plate 22, and a leakage inductance of the leakage transformer 2 is determined by the gaps 27. In other words, the leakage inductance of the leakage transformer 2 is adjusted by varying the gaps 27. In addition, the gap between the winding pillar 23 and the second plate 22 is mandatory for disposing the magnetizing inductance (Lm).

Consequently, the leakage inductance of the leakage transformer 2 is determined by a gap 27 defined by the magnetic shunt elements 26 rather than the gap between the winding pillars 23. Therefore, both the high power density and the high leakage inductance are taken into consideration. In addition, the winding of the leakage transformer 2 are split into a plurality of parts wound around the winding pillars 23 respectively, which can significantly reduce the proximity loss on windings.

Figure 6:
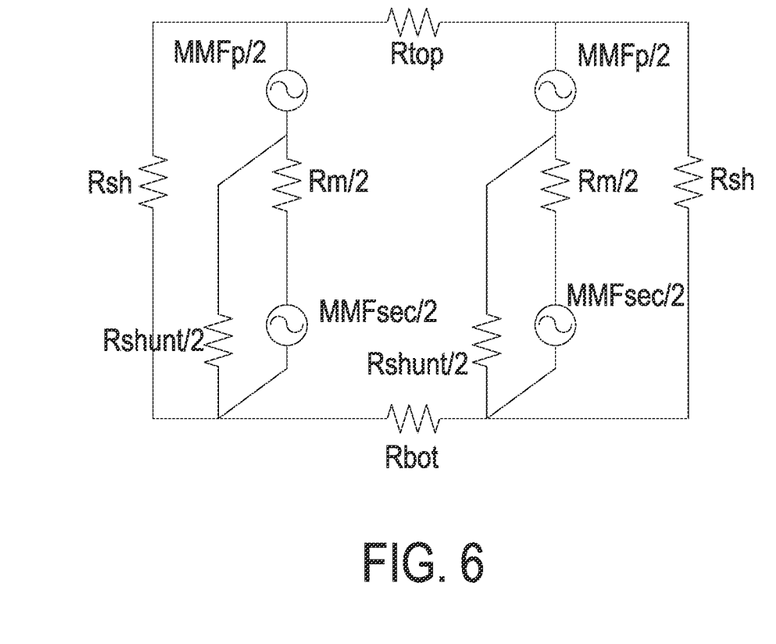
FIG. 6 is a schematic circuit diagram illustrating an equivalent circuit of the leakage transformer according to the second embodiment of the present disclosure.

In the embodiment shown in FIG. 4 and FIG. 5, the leakage transformer 2 includes two winding pillars 23, two magnetic shunt elements 26, and two gaps 27 between the magnetic shunt element 26 and the second plate 22. Meanwhile, the equivalent circuit of the leakage transformer 2 in this embodiment is shown in FIG. 6, where Rtop is the reluctance of the second plate 22, Rbot is the reluctance of the first plate 21, Rsh is the reluctance of the side pillar 28, Rm is the sum of the reluctance of gap between the winding pillar 23 and the second plate 22 and the reluctance of the winding pillars 23, Rshunt is the sum of the reluctance of the gap 27 and the reluctance of the two magnetic shunt elements 26, MMFp is the primary magnetomotive force, MMFsec is the secondary magnetomotive force. MMFp is the result of multiplying the number of turns of the primary winding 24 by the primary current, and MMFsec is the result of multiplying the number of turns of the secondary winding 25 by the secondary current.

From the above descriptions, the present disclosure provides a leakage transformer. The leakage inductance of the leakage transformer is determined by a gap defined by the magnetic shunt elements rather than the distance between the primary and secondary windings and the gap between the winding pillar and the second plate. Therefore, both the high power density and the high leakage inductance are taken into consideration. In addition, the winding of the leakage transformer are split into a plurality of parts wound around the winding pillars respectively, which can significantly reduce the proximity loss on windings.

While the disclosure has been described in terms of what is presently considered to be the most practical and preferred embodiments, it is to be understood that the disclosure needs not be limited to the disclosed embodiment.

What is claimed is:

1. A leakage transformer, comprising:
a first plate and a second plate;
a plurality of first winding pillars interiorly disposed on the first plate;
a plurality of second winding pillars interiorly disposed on the second plate and aligned with the plurality of first winding pillars respectively;
a primary winding wound around the plurality of first winding pillars;
a secondary winding wound around the plurality of second winding pillars;
a plurality of magnetic shunt elements, wherein each magnetic shunt element is disposed between a corresponding pair of the first winding pillar and the eding-second winding pillar, there is a gap between every two neighboring magnetic shunt elements, and a leakage inductance of the leakage transformer is determined by the at least one gap; and
two side pillars, wherein each of the two side pillars is disposed directly between the first plate and the second plate, and wherein each magnetic shunt element is interiorly disposed between the two side pillars,
wherein the primary winding is split into a plurality of parts wound around the plurality of first winding pillars respectively, and the plurality of parts of the primary winding are connected in series or in parallel; the secondary winding is split into a plurality of parts wound around the plurality of second winding pillars respectively, and the plurality of parts of the secondary winding are connected in series or in parallel.

2. The leakage transformer according to claim 1, wherein the leakage inductance of the leakage transformer is adjusted by varying the at least one gap.

3. The leakage transformer according to claim 1, wherein the number of the plurality of first winding pillars is even, and the number of second winding pillars is even.

4. The leakage transformer according to claim 1, wherein the magnetic shunt element is directly connected with the corresponding first and second winding pillars.

* * * * *